US011001905B2

(12) United States Patent
Ota et al.

(10) Patent No.: US 11,001,905 B2
(45) Date of Patent: May 11, 2021

(54) STEEL PLATE FOR STRUCTURAL PIPES OR TUBES, METHOD OF PRODUCING STEEL PLATE FOR STRUCTURAL PIPES OR TUBES, AND STRUCTURAL PIPES AND TUBES

(71) Applicant: JFE STEEL CORPORATION, Tokyo (JP)

(72) Inventors: Shusaku Ota, Tokyo (JP); Yoshiaki Ota, Tokyo (JP); Shinichi Kakihara, Tokyo (JP); Nobuyuki Ishikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 155 days.

(21) Appl. No.: 15/560,626

(22) PCT Filed: Mar. 25, 2016

(86) PCT No.: PCT/JP2016/001766
§ 371 (c)(1),
(2) Date: Sep. 22, 2017

(87) PCT Pub. No.: WO2016/152173
PCT Pub. Date: Sep. 29, 2016

(65) Prior Publication Data

US 2018/0057906 A1 Mar. 1, 2018
US 2018/0298461 A9 Oct. 18, 2018

(30) Foreign Application Priority Data

Mar. 26, 2015 (JP) ............................ JP2015-065168

(51) Int. Cl.

| | |
|---|---|
| ***C21D 9/46*** | (2006.01) |
| ***C22C 38/38*** | (2006.01) |
| ***C21D 8/02*** | (2006.01) |
| ***C22C 38/26*** | (2006.01) |
| ***C22C 38/28*** | (2006.01) |
| ***C22C 38/58*** | (2006.01) |
| ***C22C 38/00*** | (2006.01) |
| ***C22C 38/02*** | (2006.01) |
| ***C22C 38/06*** | (2006.01) |
| ***C22C 38/22*** | (2006.01) |
| ***C22C 38/24*** | (2006.01) |
| ***C22C 38/42*** | (2006.01) |
| ***C22C 38/44*** | (2006.01) |
| ***C22C 38/46*** | (2006.01) |

(Continued)

(52) U.S. Cl.
CPC ................. *C21D 9/46* (2013.01); *C21D 8/02* (2013.01); *C21D 8/0226* (2013.01); *C21D 8/0263* (2013.01); *C22C 38/00* (2013.01); *C22C 38/001* (2013.01); *C22C 38/002* (2013.01); *C22C 38/02* (2013.01); *C22C 38/06* (2013.01); *C22C 38/22* (2013.01); *C22C 38/24* (2013.01); *C22C 38/26* (2013.01); *C22C 38/28* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *F16L 9/17* (2013.01); *C21D 2211/001* (2013.01); *C21D 2211/002* (2013.01); *C21D 2211/008* (2013.01)

(58) Field of Classification Search
CPC ...... C21D 8/02; C21D 8/0405; C21D 8/0426; C21D 8/0473; C21D 8/105; C21D 9/08; C21D 9/085; C21D 9/14; C21D 9/46; C21D 2211/002; C21D 7/13; C21D 8/0226; C21D 8/0263; C21D 8/0463; C21D 8/1222; C21D 8/1261
See application file for complete search history.

(56) References Cited

U.S. PATENT DOCUMENTS 8,765,269 B2 7/2014 Shimamura et al.
9,683,275 B2 6/2017 Zhang et al.
(Continued)

FOREIGN PATENT DOCUMENTS

CN 102308013 A 1/2012
CN 103014554 A 4/2013
(Continued)

OTHER PUBLICATIONS

Jan. 2, 2018, Extended European Search Report issued by the European Patent Office in the corresponding European Patent Application No. 16768076.8.
Oct. 18, 2018, Office Action issued by the Canadian Intellectual Property Office in the corresponding Canadian Patent Application No. 2,980,252.
(Continued)

*Primary Examiner* — Vanessa T. Luk
(74) *Attorney, Agent, or Firm* — Kenja IP Law PC

(57) ABSTRACT

Disclosed is, as a high-strength steel plate of API X80 grade or higher with a thickness of 38 mm or more, a steel plate for structural pipes or tubes that exhibits excellent resistance to PWHT and excellent toughness at the heat-affected zone, particularly at the butting faces joined by welding, without addition of large amounts of alloying elements. The steel plate for structural pipes or tubes disclosed herein has a specific chemical composition, in which the steel plate has mechanical properties including: (a) a 0.5% yield strength of 555 MPa or more; (b) a tensile strength of 625 MPa or more; and (c) a Charpy absorption energy $vE_{-10^\circ C.}$ at −10° C. at its mid-thickness part of 250 J or more, and maintains the mechanical properties (a) to (c) even after subjection to heat treatment at 650° C. for 2 hours.

14 Claims, No Drawings

(51) Int. Cl.

| | |
|---|---|
| ***C22C 38/48*** | (2006.01) |
| ***C22C 38/50*** | (2006.01) |
| ***F16L 9/17*** | (2006.01) |

(56) References Cited

U.S. PATENT DOCUMENTS

| | | | | |
|---|---|---|---|---|
| 2008/0283160 | A1* | 11/2008 | Takahashi ............ | C21D 8/0226 148/593 |
| 2009/0297872 | A1* | 12/2009 | Takahashi ............... | B21C 37/08 428/586 |
| 2015/0090370 | A1 | 4/2015 | Shimamura et al. | |

FOREIGN PATENT DOCUMENTS

| | | | | |
|---|---|---|---|---|
| JP | 11050188 | A | * | 2/1999 |
| JP | H1150188 | A | | 2/1999 |
| JP | 2004269964 | A | * | 9/2004 |
| JP | 2007270194 | A | | 10/2007 |
| JP | 2007321228 | A | | 12/2007 |
| JP | 2009174024 | A | | 8/2009 |
| JP | 2010235986 | A | * | 10/2010 |
| JP | 2010235986 | A | | 10/2010 |
| JP | 2012158791 | A | * | 8/2012 |
| JP | 2012158791 | A | | 8/2012 |
| JP | 2013147742 | A | * | 8/2013 |
| JP | 2013227671 | A | | 11/2013 |

OTHER PUBLICATIONS

Dec. 8, 2018, Office Action issued by the Korean Intellectual Property Office in the corresponding Korean Patent Application No. 10-2017-7030021 with English language concise statement of relevance.

Sep. 4, 2018, Office Action issued by the State Intellectual Property Office in the corresponding Chinese Patent Application No. 201680017298.4 with English language Search Report.

Jun. 14, 2016, International Search Report issued in the International Patent Application No. PCT/JP2016/001766.

* cited by examiner

STEEL PLATE FOR STRUCTURAL PIPES OR TUBES, METHOD OF PRODUCING STEEL PLATE FOR STRUCTURAL PIPES OR TUBES, AND STRUCTURAL PIPES AND TUBES

TECHNICAL FIELD

This disclosure relates to a steel plate for structural pipes or tubes, and in particular, to a steel plate for structural pipes or tubes that has strength of API X80 grade or higher and that exhibits excellent resistance to PWHT and excellent toughness at the heat-affected zone.

This disclosure also relates to a method of producing a steel plate for structural pipes or tubes, and to a structural pipe or tube produced from the steel plate for structural pipes or tubes.

BACKGROUND

For excavation of oil and gas by seabed resource drilling ships and the like, structural pipes or tubes such as conductor casing steel pipes or tubes, riser steel pipes or tubes, and the like are used. In these applications, there has been an increasing demand for high-strength steel pipes or tubes of no lower than American Petroleum Institute (API) X80 grade from the perspectives of improving operation efficiency with increased pressure and reducing material costs.

Such structural pipes or tubes are often used with forged products containing alloying elements in very large amounts (such as connectors) subjected to girth welding. For a forged product subjected to welding, post weld heat treatment (PWHT) is performed to remove the residual stress caused by the welding from the forged product. In this case, there may be a concern about deterioration of strength after heat treatment. Accordingly, structural pipes or tubes are required to retain excellent strength, in particular high strength, in their longitudinal direction, that is, rolling direction, even after subjection to PWHT in order to prevent fractures during excavation by external pressure on the seabed. In addition, by applying PWHT, the carbide formed in the heat-affected zone becomes coarse during welding, which may lower the toughness of the steel. It is thus required for structural pipes or tubes to have sufficient strength and toughness not only in the state of base metal before PWHT but also after PWHT.

Thus, for example, JPH1150188A (PTL 1) proposes a process for producing a high-strength steel plate for riser steel pipes or tubes that can exhibit excellent strength even after subjection to stress relief (SR) annealing, which is one type of PWHT, at a high temperature of 600° C. or higher, by hot rolling a steel to which 0.30% to 1.00% of Cr, 0.005% to 0.0030% of Ti, and 0.060% or less of Nb are added, and then subjecting it to accelerated cooling.

In addition, JP2010235986A (PTL 2) proposes a technique for producing a steel plate excellent in strength of base metal and in resistance to PWHT by controlling the microstructure of the steel and precipitation of composite carbide, the technique including: hot-rolling a steel containing 0.005% to 0.025% of Ti, 0.005% to 0.025% of Nb, 0.15% to 0.60% of Mo, and 0.10% or less of V; and then accelerated-cooling the steel under specific conditions.

CITATION LIST

Patent Literature

PTL 1: JPH1150188A
PTL 2: JP2010235986A

SUMMARY

Technical Problem

In the steel plate described in PTL 1, however, Cr carbide is caused to precipitate at the time of PWHT in order to compensate for the decrease in strength due to PWHT, which requires adding a large amount of Cr. Accordingly, in addition to high material cost, weldability and toughness may deteriorate.

In addition, the steel pipe or tube described in PTL 2 focuses on improving the base material strength and toughness after subjection to PWHT, and no particular consideration is given to the decrease in toughness at butting faces, which poses a problem in welding during manufacture of steel pipes or tubes, particularly in large-heat input welding as carried out from inside and outside to form one layer on each side. The toughness of butting faces considered in the present disclosure is greatly affected by a locally embrittled region generated during multi-layer welding. On the other hand, in PTL 2, the toughness of coarse grains near the weld metal is evaluated by a reproduced thermal cycle test. In the case of simulating the microstructure of the local embrittled region based on reproduced thermal cycle, the embrittled region spans over the entire test piece, and the toughness of butting faces is underestimated, which is inappropriate. In addition, the technique of PTL 2 involves large production loads resulting from, for example, air cooling after rapid heating.

The present disclosure could thus be helpful to provide, as a high-strength steel plate of API X80 grade or higher, a steel plate for structural pipes or tubes that exhibits excellent resistance to PWHT and excellent toughness at the heat-affected zone (HAZ), particularly at the butting faces joined by welding, without addition of large amounts of alloying elements.

The present disclosure could also be helpful to provide a method of producing the above-described steel plate for structural pipes or tubes, and a structural pipe or tube produced from the steel plate for structural pipes or tubes.

Solution to Problem

For steel plates for structural pipes or tubes, we conducted detailed studies on the influence of rolling conditions on their microstructures in order to determine how to balance resistance to PWHT and toughness at the heat-affected zone (HAZ toughness). In general, the steel components for welded steel pipes or tubes and steel plates for welded structures are strictly limited from the viewpoint of weldability. Thus, high-strength steel plates of X65 grade or higher are manufactured by being subjected to hot rolling and subsequent accelerated cooling. Thus, the steel plate has a microstructure that is mainly composed of bainite or a microstructure in which martensite austenite constituent (also referred to as MA) is formed in bainite, yet when applying PWHT to a steel with such microstructure, martensite austenite constituent contained in bainite is decomposed through tempering, and deterioration of strength would be inevitable. On the other hand, there is a conventional method of utilizing strengthening by precipitation of elements such as Nb, V, and Ti to compensate for the decrease in strength due to tempering. However, when a steel pipe or tube is produced by large-heat input welding which is carried out from inside and outside to form one layer on each side, carbide is easily coarsened at butting faces, causing a decrease in toughness.

In view of the above, we conducted intensive studies on a microstructure capable of exhibiting excellent resistance to PWHT and HAZ toughness, and as a result, made the following findings:

(a) In order to improve resistance to PWHT, it is necessary for a steel to have a microstructure that does not exhibit a morphological change before and after PWHT. To this end, it is effective to control formation of martensite austenite constituent and cementite by controlling the C content of the steel and temperature conditions during accelerated cooling.

(b) To obtain a steel plate excellent in toughness in HAZ at butting faces, it is effective to suppress the precipitation of Ti, Nb, and V carbides in HAZ at butting faces and to avoid deterioration of toughness due to hardening of HAZ.

Based on the above findings, we made intensive studies on the chemical compositions and microstructures of steel as well as on the production conditions, and completed the present disclosure.

Specifically, the primary features of the present disclosure are as described below.

1. A steel plate for structural pipes or tubes, comprising: a chemical composition that contains (consists of), in mass %, C: 0.050% to 0.080%, Si: 0.01% to 0.50%, Mn: 1.50% to 2.50%, Al: 0.080% or less, Cr: 0.50% or less, Mo: 0.10% to 0.50%, Ti: 0.005% to 0.025%, Nb: 0.005% to 0.050%, N: 0.001% to 0.010%, O: 0.0050% or less, P: 0.010% or less, S: 0.0020% or less, and the balance consisting of Fe and inevitable impurities, with the chemical composition satisfying a set of conditions including: a carbon equivalent $C_{eq}$ as defined by the following Expression (1) of 0.43 or more, $P_{cm}$ as defined by the following Expression (2) of 0.20 or less, and X as defined by the following Expression (3) of 0.8 or more:

$$C_{eq}=C+Mn/6+(Cu+Ni)/15+(Cr+Mo+V)/5 \quad (1),$$

$$P_{cm}=C+Si/30+Mn/20+Cu/20+Mo/15+V/10+5B \quad (2),$$

$$X=(0.23Cr+0.125Mo+0.13Nb+0.24V+0.25Ti)/C \quad (3),$$

where each element symbol indicates content in mass % of the element in the steel plate and has a value of 0 if the element is not contained in the steel plate, wherein the steel plate has mechanical properties including: (a) a 0.5% yield strength of 555 MPa or more; (b) a tensile strength of 625 MPa or more; and (c) a Charpy absorption energy $vE_{-10^\circ C.}$ at −10° C. at its mid-thickness part of 250 J or more, and the steel plate maintains the mechanical properties (a) to (c) even after subjection to heat treatment at 650° C. for 2 hours.

2. The steel plate for structural pipes or tubes according to claim 1, wherein the chemical composition further contains, in mass %, V: 0.030% or less.

3. The steel plate for structural pipes or tubes according to claim 1 or 2, wherein the chemical composition further contains, in mass %, one or more selected from the group consisting of Cu: 0.50% or less, Ni: 0.50% or less, and Ca: 0.0005% to 0.0035%.

4. The steel plate for structural pipes or tubes according to any one of claims 1 to 3, wherein the chemical composition further satisfies relations of $0.01<Y<0.05$ and $Z<3.10$, where Y and Z are defined by:

$$Y=A*55.85 \quad (4),$$

$$Z=(C/12-A)*A*1000000 \quad (5),$$

$$A=Ti/47.9+Nb/92.9+V/50.9 \quad (6),$$

where each element symbol indicates content in mass % of the element in the steel plate and has a value of 0 if the element is not contained in the steel plate.

5. A method of producing a steel plate for structural pipes or tubes, comprising at least: heating a steel raw material having the chemical composition as recited in any one of claims 1 to 4 to a heating temperature of 1050° C. to 1250° C.; hot-rolling the heated steel raw material to obtain a steel plate; accelerated-cooling the hot-rolled steel plate under a set of conditions including a cooling start temperature being no lower than $Ar_3$, a cooling end temperature being no lower than (T−50) ° C. and no higher than (T+50) ° C., where T is a temperature defined by the following Expression (7), and an average cooling rate being 20° C./s or higher:

$$T=539-423C-30.4Mn-17.7Ni-12.1Cr-7.5Mo \quad (7),$$

where each element symbol indicates content in mass % of the element in the steel plate and has a value of 0 if the element is not contained in the steel plate.

6. A structural pipe or tube formed from the steel plate for structural pipes or tubes as recited in any one of claims 1 to 4.

7. A structural pipe or tube obtainable by forming the steel plate as recited in any one of claims 1 to 4 into a tubular shape in its longitudinal direction, and then joining butting faces by welding from inside and outside to form at least one layer on each side along the longitudinal direction.

Advantageous Effect

According to the present disclosure, it is possible to provide, as a high-strength steel plate of API X80 grade or higher, a steel plate for structural pipes or tubes that exhibits excellent resistance to PWHT and excellent toughness at the heat-affected zone (HAZ), particularly at the butting faces joined by welding, and a structural pipe or tube formed from the steel plate for structural pipes or tubes.

DETAILED DESCRIPTION

[Chemical Composition]

Reasons for limitations on the features of the disclosure will be explained below.

In the present disclosure, it is important that a steel plate for structural pipes or tubes has a specific chemical composition. The reasons for limiting the chemical composition of the steel as stated above are explained first. The % representations below indicating the chemical composition are in mass % unless otherwise noted.

C: 0.050% to 0.080%

C is an element for increasing the strength of steel. To obtain a desired microstructure for desired strength and toughness, the C content needs to be 0.050% or more. However, if the C content exceeds 0.080%, weldability deteriorates, weld cracking tends to occur, and the toughness of base steel and HAZ toughness are lowered. Therefore, the C content is set to 0.080% or less. The C content is preferably 0.055% to 0.070%.

Si: 0.01% to 0.50%

Si is an element that acts as a deoxidizing agent and increases the strength of the steel material by solid solution strengthening. To obtain this effect, the Si content is set to 0.01% or more. On the other hand, since Si suppresses the formation of cementite, it has an action to promote concentration of C into austenite at the time of bainite transformation. Since MA is formed by enrichment of carbon into non-transformed austenite at the time of formation of upper bainite, excessively adding Si causes formation of MA, resulting in lower HAZ toughness. Therefore, in this disclosure, the Si content is set to 0.50% or less. The Si content is preferably 0.05% to 0.20%.

Mn: 1.50% to 2.50%

Mn is an effective element for increasing the hardenability of steel and improving strength and toughness. To obtain this effect, the Mn content is set to 1.50% or more, and preferably 1.70% or more. However, Mn content of greater than 2.50% causes deterioration of weldability. Therefore, the Mn content is set to 2.50% or less. The Mn content is preferably 2.00% or less.

Al: 0.080% or less

Al is an element that is added as a deoxidizer for steelmaking. However, Al content of greater than 0.080% leads to reduced toughness. Therefore, the Al content is set to 0.080% or less. The Al content is preferably from 0.010% to 0.050%.

Cr: 0.50% or less

Cr is an element that forms a carbide and has an action to increase the strength at high temperature. Excessively adding Cr, however, causes deterioration in weldability. Therefore, the Cr content is set to 0.50% or less. No lower limit is placed on the Cr content, yet in order to allow the above action to be exhibited satisfactorily, it is preferable to set the Cr content to 0.05% or more.

Mo: 0.10% to 0.50%

Mo is a particularly important element for the present disclosure that functions to greatly increase the strength of the steel plate by forming fine complex carbides with Ti, Nb, and V, while suppressing pearlite transformation during cooling after hot rolling. To obtain this effect, the Mo content is set to 0.10% or more. However, Mo content of greater than 0.50% leads to reduced HAZ toughness. Therefore, the Mo content is set to 0.50% or less.

Ti: 0.005% to 0.025%

Ti forms complex precipitates with Mo and greatly contributes to improvement in the strength of steel. To obtain this effect, the Ti content is set to 0.005% or more. However, adding Ti beyond 0.025% leads to deterioration in HAZ toughness and toughness of base steel. Therefore, the Ti content is set to 0.025% or less.

Nb: 0.005% to 0.050%

Nb is an effective element for improving toughness by refining microstructures. In addition, Nb forms composite precipitates with Mo and contributes to improvement in strength. To obtain this effect, the Nb content is set to 0.005% or more. However, Nb content of greater than 0.050% causes deterioration of HAZ toughness. Therefore, the Nb content is set to 0.050% or less.

N: 0.001% to 0.010%

N is normally present in the steel as an inevitable impurity and, forms a nitride (TiN) with Ti in the steel. To suppress coarsening of austenite grains caused by the pinning effect of TiN, the N content is set to 0.001% or more. However, TiN decomposes in the weld zone, particularly in the region heated to 1450° C. or higher near the weld bond, and produces solute N. Accordingly, if the N content is excessively increased, a decrease in toughness due to the formation of the solute N becomes noticeable. Therefore, the N content is set to 0.010% or less. The N content is preferably 0.002% to 0.005%.

O: 0.0050% or less, P: 0.010% or less, S: 0.0020% or less

In the present disclosure, O, P, and S are inevitable impurities, and the upper limit for the contents of these elements is defined as follows. O forms coarse oxygen inclusions that adversely affect toughness. To suppress the influence of the inclusions, the O content is set to 0.005% or less. In addition, P lowers the toughness of the base metal upon central segregation, and a high P content causes the problem of reduced toughness of base metal. Therefore, the P content is set to 0.010% or less. In addition, S forms MnS inclusions and lowers the toughness of base metal, and a high S content causes the problem of reduced toughness of the base material. Therefore, the S content is set to 0.0020% or less. It is noted here that the O content is preferably 0.0030% or less, the P content is preferably 0.008% or less, and the S content is preferably 0.0008% or less. No lower limit is placed on the contents of O, P, and S, yet in industrial terms the lower limit is more than 0%. On the other hand, excessively reducing the contents of these elements leads to longer refining time and increased cost. Therefore, the O content is 0.0005% or more, the P content is 0.002% or more, and the S content is 0.0002% or more.

In addition to the above elements, the steel plate for structural pipes or tubes disclosed herein may further contain V: 0.030% or less.

V: 0.030% or less

In the same way as Nb and Ti, V forms composite precipitates and is an extremely effective element for contributing to improvement in strength through strengthening by precipitation. Excessively adding V, however, leads to a decrease in HAZ toughness. Therefore, when V is added, the V content is set to 0.030% or less. On the other hand, no lower limit is placed on the V content, yet attempts to completely remove V lead to an increase in production costs. Therefore, the V content may be 0.001% or more. It is noted here that V precipitates as VC in a portion subjected to more than one heat hysteresis cycle, such as in HAZ at butting faces, and causes the HAZ portion to harden, which may result in significant deterioration in toughness. Therefore, it is preferable not to add V.

In addition to the above elements, the steel plate for structural pipes or tubes may further contain Cu: 0.50% or less, Ni: 0.50% or less, and Ca: 0.0005% to 0.0035%.

Cu: 0.50% or less

Cu is an effective element for improving toughness and strength, yet excessively adding Cu causes deterioration of weldability. Therefore, when Cu is added, the Cu content is set to 0.50% or less. No lower limit is placed on the Cu content, yet when Cu is added, the Cu content is preferably 0.05% or more.

Ni: 0.50% or less

Ni is an effective element for improving toughness and strength, yet excessively adding Ni causes deterioration of resistance to PWHT. Therefore, when Ni is added, the Ni content is set to 0.50% or less. No lower limit is placed on the Ni content, yet when Ni is added, the Ni content is preferably to 0.05% or more.

Ca: 0.0005% to 0.0035%

Ca is an effective element for improving toughness by morphological control of sulfide inclusions. To obtain this effect, when Ca is added, the Ca content is set to 0.0005% or more. However, adding Ca beyond 0.0035% does not increase the effect, but rather leads to a decrease in the cleanliness of the steel, causing deterioration of toughness. Therefore, when Ca is added, the Ca content is set to 0.0035% or less.

The steel plate for structural pipes or tubes disclosed herein consists of the above-described components and the balance of Fe and inevitable impurities. As used herein, the phrase "consists of . . . the balance of Fe and inevitable impurities" is intended to encompass a chemical composition that contains inevitable impurities and other trace elements as long as the action and effect of the present disclosure are not impaired.

In the present disclosure, it is important that all of the elements contained in the steel satisfy the above-described conditions and that the chemical composition has a carbon equivalent $C_{eq}$ as defined by the following Expression (1) of 0.43 or more, $P_{cm}$ as defined by the following Expression (2) of 0.20 or less, and X as defined by the following Expression (3) of 0.8 or more:

$$C_{eq}=C+Mn/6+(Cu+Ni)/15+(Cr+Mo+V)/5 \quad (1),$$

$$P_{cm}=C+Si/30+Mn/20+Cu/20+Mo/15+V/10+5B \quad (2),$$

$$X=(0.23Cr+0.125Mo+0.13Nb+0.24V+0.25Ti)/C \quad (3),$$

where each element symbol indicates content in mass % of the element in the steel plate and has a value of 0 if the element is not contained in the steel plate.

$C_{eq}$ represents the influence of the elements added to the steel in terms of carbon content, and $C_{eq}$ is commonly used as an index of strength as it correlates with the strength of base metal. In the present disclosure, to obtain a high strength of API X80 grade or higher, $C_{eq}$ is set to 0.43 or more. $C_{eq}$ is preferably 0.44 or more. No upper limit is placed on $C_{eq}$, yet a preferred upper limit is 0.50.

$P_{cm}$ is a weld crack sensitivity composition. $P_{cm}$ greater than 0.20 adversely affects the toughness of the weld, and thus $P_{cm}$ is adjusted to 0.20 or less. $P_{cm}$ is preferably adjusted to 0.19 or less. No lower limit is placed on $P_{cm}$, yet a preferred lower limit is 0.15.

X is the sum of the ratios of the contents of the elements (Cr, Mo, Nb, V, and Ti), which have the action of suppressing the decrease in strength after PWHT, to the C content. To suppress a significant decrease in strength occurring after PWHT, it is necessary to adjust the value of X to 0.8 or more. X is preferably adjusted to 1.0 or more. On the other hand, no upper limit is placed on X, yet excessively high X leads to an increase in alloy costs. Therefore, X is preferably adjusted to 3.00% or less.

Further, in the present disclosure, it is preferable that the chemical composition of the steel satisfies relations of $0.01<Y<0.05$ and $Z<3.10$, where Y and Z are defined by:

$$Y=A*55.85 \quad (4),$$

$$Z=(C/12-A)*A*1000000 \quad (5),$$

$$A=Ti/47.9+Nb/92.9+V/50.9 \quad (6),$$

where each element symbol indicates content in mass % of the element in the steel plate and has a value of 0 if the element is not contained in the steel plate.

Y is the sum of the element ratios of elements for strengthening by precipitation, Ti, Nb, and V, contained in the steel, and is an index of strengthening by precipitation. Utilization of these elements for strengthening by precipitation is indispensable to make the strength of the steel equal to or higher than API X 80 grade. Therefore, Y is preferably adjusted to more than 0.01. However, excessive addition of these elements causes a decrease in toughness, particularly the toughness in HAZ at butting faces. Therefore, Y is preferably adjusted to less than 0.05.

Z is obtained by multiplying the total amount of elements for strengthening by precipitation, Ti, Nb, and V, by the amount of residual C which did not form carbide with these elements, and is used as an index of decrease in toughness due to the growth of carbide after PWHT. When the amount of residual carbon is excessive, the toughness decreases in HAZ at butting faces. Therefore, Z is preferably adjusted to less than 3.10. Although no lower limit is placed on Z, yet a preferred lower limit is 0.50.

[Microstructure]

The microstructure of the steel plate disclosed herein is not particularly limited and may be arbitrary. However, from the perspective of increasing strength, the microstructure of the steel plate preferably contains bainite in area fraction of 85% or more, and more preferably 90% or more. On the other hand, the area fraction of bainite is preferably as high as possible without any upper limit. The area fraction of bainite may be 100%.

The amount of microstructure other than bainite is preferably as small as possible. However, when the area fraction of bainite is sufficiently high, the influence of the residual microstructure is almost negligible, and the total area fraction of one or more of the microstructure other than bainite in the microstructure is preferably up to 15%, and more preferably up to 10%. Examples of the residual microstructure include ferrite, pearlite, cementite, and martensite. From the perspective of increasing strength, it is preferable to further reduce the area fraction of martensite austenite constituent in the whole volume of the microstructure of the steel plate to less than 3%. In addition, the area fraction of cementite in the whole volume of the microstructure of the steel plate is preferably as small as possible. Specifically, the area fraction of cementite is preferably 2.0% or less, and more preferably 1.0% or less.

[Mechanical Properties]

The steel plate for structural pipes or tubes disclosed herein has the following mechanical properties (a) to (c) in a state of base metal before subjection to PWHT, and maintains the mechanical properties (a) to (c) even after subjection to heat treatment at 650° C. for 2 hours:

(a) a 0.5% yield strength (YS) of 555 MPa or more;

(b) a tensile strength (TS) of 625 MPa or more; and (c) a Charpy absorption energy at −10° C. ($vE_{-10° C.}$) at its mid-thickness part of 250 J or more.

Here, 0.5% YS, TS, and $vE_{-10° C.}$ can be measured with the methods described in examples explained later. No upper limit is placed on 0.5% YS, TS, and $vE_{-10° C.}$, yet, normally, 0.5% YS is 705 MPa or less, TS is 825 MPa or less, and $vE_{-10° C.}$ is 800 J or less.

[Steel Plate Production Method]

Next, a method of producing a steel plate according to the present disclosure is described. In the following explanation, it is assumed that the temperature is the average temperature in the thickness direction of the steel plate unless otherwise noted. The average temperature in the plate thickness direction can be determined by, for example, the plate thickness, surface temperature, or cooling conditions through simulation calculation or the like. For example, the average temperature in the plate thickness direction of the steel plate can be determined by calculating the temperature distribution in the plate thickness direction using a finite difference method.

The steel plate for structural pipes or tubes disclosed herein may be produced by sequentially performing operations (1) to (3) below on the steel raw material having the above chemical composition.

(1) heating the steel raw material to a heating temperature of 1050° C. to 1250° C.;
(2) hot-rolling the heated steel material to obtain a hot-rolled steel plate; and
(3) accelerated-cooling the hot-rolled steel plate under a set of conditions including a cooling start temperature being no lower than $Ar_3$, a cooling end temperature being no lower than (T−50) ° C. and no higher than (T+50) ° C., where T is a temperature defined by the following Expression (7), and an average cooling rate being 20° C./s or higher:

$$T=539-423C-30.4Mn-17.7Ni-12.1Cr-7.5Mo \quad (7),$$

where each element symbol indicates content in mass % of the element in the steel plate and has a value of 0 if the element is not contained in the steel plate.

Specifically, the above-described operations may be performed as described below.

[Steel Raw Material]

The above-described steel raw material may be prepared with a regular method. The method of producing the steel raw material is not particularly limited, yet the steel raw material is preferably prepared with continuous casting.

[Heating]

The steel raw material is heated prior to rolling. At that time, to sufficiently promote austenitization and dissolution of carbide and to obtain sufficient strength at room temperature, it is necessary to set the heating temperature at or above 1050° C. so that the carbide can solidify in the steel material (semi-finished product). However, a heating temperature above 1250° C. causes significant growth and coarsening of austenite grains, and as a result, the microstructure of the base metal of the resulting steel becomes coarse, causing deterioration in toughness. Therefore, the heating temperature is set to 1050° C. to 1250° C.

[Hot Rolling]

Then, the heated steel raw material is rolled to obtain a hot-rolled steel plate. Conditions for hot rolling are not particularly limited. However, for example, by setting the cumulative reduction at the non-recrystallization temperature range (850° C. or lower) to 40% or more and the rolling finish temperature to 730° C. to 850° C., it is possible to refine crystal grains and increase the strength and toughness of the steel plate. The cumulative rolling reduction ratio is preferably 80% or less, and more preferably 75% or less.

[Accelerated Cooling]

After completion of the hot rolling, the hot-rolled steel plate is subjected to accelerated cooling. At that time, when cooling is started from the dual-phase region below $Ar_3$, the microstructure is mixed with polygonal ferrite, and the strength of the steel plate decreases. Therefore, accelerated cooling is started from $Ar_3$ or higher, that is, from an austenite single phase region. In this case, $Ar_3$ is a temperature calculated by:

$$Ar_3=910-310C-80Mn-20Cu-15Cr-55Ni-80Mo,$$

where each element symbol indicates content in mass % of the element in the steel plate and has a value of 0 if the element is not contained in the steel plate. No upper limit is placed on the cooling start temperature, yet from the perspective of ensuring a rolling reduction ratio in the non-recrystallization temperature range, a preferred upper limit is 800° C.

In the present disclosure, the cooling end temperature is defined as no lower than (T−50) ° C. and no higher than (T+50) ° C., where T is a temperature defined by the following Equation (7). If the cooling end temperature is higher than (T+50) ° C., the growth of carbides is promoted, the amount of solute carbon decreases, the carbide becomes coarse after PWHT, and sufficient strength can not be obtained. In addition, although the strength of the steel plate tends to increase with decreasing accelerated cooling end temperature, when the cooling end temperature is lower than (T−50) ° C., martensite austenite constituent is formed and toughness is noticeably deteriorated. Therefore, the cooling stop temperature was set to no lower than (T−50) ° C. and no higher than (T+50) ° C.

$$T=539-423C-30.4Mn-17.7Ni-12.1Cr-7.5Mo \quad (7),$$

where each element symbol indicates content in mass % of the element in the steel plate and has a value of 0 if the element is not contained in the steel plate.

In addition, the strength of the steel plate tends to increase with increasing cooling rate in accelerated cooling. When the cooling rate during accelerated cooling is below 20° C./s, microstructural transformations occur at high temperature and recovery of dislocation also progresses during cooling, making it impossible to obtain sufficient strength at room temperature. Therefore, the cooling rate at accelerated cooling is set to 20° C./s or higher. No upper limit is placed on the cooling rate, yet a preferred upper limit is 50° C./s from the perspective of preventing generation of a large amount of low-temperature transformation phase (i.e., martensite) other than bainite.

By performing accelerated cooling under the above conditions, the steel plate may have a microstructure mainly composed of bainite and increased strength.

Through the above process, it is possible to produce, as a steel plate for structural pipes or tubes having high strength, a steel plate of API X80 grade or higher and is excellent in resistance to PWHT and HAZ toughness without addition of large amounts of alloying elements. In particular, in the present disclosure, by starting accelerated cooling from the austenite single phase region and stopping cooling near the martensitic transformation point at which MA begins to form, it is possible to effectively suppress the precipitation of carbides while effectively utilizing transformation strengthening, and it is possible to suppress the decrease in strength after PWHT.

The steel plate may have any thickness without limitation, yet a preferred thickness range is from 15 mm to 30 mm.

[Steel Pipe or Tube]

A steel pipe or tube can be produced by using the steel plate thus obtained as a material. The steel pipe or tube may be, for example, a structural pipe or tube that is obtainable by forming the thick steel plate for structural pipes or tubes into a tubular shape in its longitudinal direction, and then joining butting faces by welding. The method of producing a steel pipe or tube is not limited to a particular method, and any method is applicable. For example, a UOE steel pipe or tube may be obtained by forming a steel plate into a tubular shape in its longitudinal direction by U press and O press following a conventional method, and then joining butting faces by seam welding. Preferably, the seam welding is performed by performing tack welding and subsequently submerged arc welding from inside and outside to form at least one layer on each side. The flux used for submerged arc welding is not limited to a particular type, and may be a fused flux or a bonded flux. After the seam welding, expansion is carried out to remove welding residual stress and to improve the roundness of the steel pipe or tube. In the expansion, the expansion ratio (the ratio of the amount of change in the outer diameter before and after expansion of the pipe or tube to the outer diameter of the pipe or tube before expansion) is normally set from 0.3% to 1.5%. From the viewpoint of the balance between the roundness improving effect and the capacity required for the expanding device, the expansion rate is preferably from 0.5% to 1.2%. Instead of the above-mentioned UOE process, a press bend method, which is a sequential forming process to perform three-point bending repeatedly on a steel plate, may be applied to form a steel pipe or tube having a substantially circular cross-sectional shape before performing seam welding in the same manner as in the above-described UOE process. In the case of the press bend method, as in the UOE process, expansion may be performed after seam welding. In the expansion, the expansion ratio (the ratio of the amount of change in the outer diameter before and after expansion of the pipe or tube to the outer diameter of the pipe or tube before expansion) is normally set from 0.3% to 1.5%. From the viewpoint of the balance between the roundness improving effect and the capacity required for the expanding device, the expansion rate is preferably from 0.5% to 1.2%. Optionally, preheating before welding or heat treatment after welding may be performed.

Examples

Steels having the chemical compositions presented in Table 1 (Steels A to L) were smelted and formed into slabs by continuous casting. The obtained slabs were heated and hot-rolled, and immediately cooled using a water cooling type accelerated cooling apparatus to produce steel plates with a thickness of 20 mm to 28 mm (Nos. 1 to 16). The production conditions of each steel plate are presented in Table 2. For each obtained steel plate, the area fraction of martensite austenite constituent in the microstructure and the mechanical properties were evaluated as described below. The evaluation results are presented in Table 3.

The area fraction of martensite austenite constituent was evaluated by observing three or more locations randomly selected on the surface of a sample taken from the mid-thickness part under a scanning electron microscope (at 2000 times magnification).

Among the mechanical properties, 0.5% yield strength (YS) and tensile strength (TS) were measured by preparing tensile test pieces of 6 mmφ and 25 mmGL sampled from each obtained steel plate at the mid-thickness part in a direction perpendicular to the rolling direction, and then conducting a tensile test on each test piece in accordance with JIS Z 2241 (1998).

As for Charpy properties, among the mechanical properties, three 2 mm V notch Charpy test pieces were sampled from the mid-thickness part with their longitudinal direction parallel to the rolling direction, and the test pieces were subjected to a Charpy impact test at −10° C. energy ($vE_{-10^\circ C.}$), to obtain absorption energy $vE_{-10^\circ C.}$, and the average values were calculated.

Further, for evaluation of PWHT resistance, PWHT treatment was performed on each steel plate using a gas atmosphere furnace. At this time, heat treatment was performed on each steel plate with each steel plate being placed in a furnace at 650° C. and retained for 2 hours upon the steel plate reaching 650° C. Thereafter, the steel plate was removed from the furnace and cooled to room temperature by air cooling. At this time, the cooling rate to room temperature was set to 5° C./sec or lower. Each steel plate subjected to PWHT treatment was measured for 0.5% YS, TS, and $vE_{-10^\circ C.}$ in the same manner as in the above-described measurements before PWHT.

Furthermore, to evaluate the HAZ toughness at butting faces, test models were welded from inside and outside to form one layer on each side with input heat of 80 kJ/cm or lower, and from each test model, three test pieces were sampled, each having a 2 mm V notch introduced in HAZ at the butting faces of the welded portion, and were each subjected to a Charpy impact test to measure Charpy absorption energy at −10° C. ($vE_{-10^\circ C.}$). Table 3 presents the average and minimum. The weld metal used was V-free. For Comparative Examples Nos. 8 to 11, the results of examining HAZ at butting faces cite the results for Example No. 2 because Steel B, which is the same as in Example No. 2, was used and it is thus clear that they would exhibit comparable properties.

As can be seen from Table 3, examples (Nos. 1 to 7) which satisfy the conditions of the present disclosure exhibited excellent mechanical properties before subjection to PWHT and excellent mechanical properties even after subjection to PWTH. The steel plates of our examples also had good HAZ toughness at the butting faces joined by welding.

On the other hand, in comparative examples (Nos. 8 to 16) which do not satisfy the conditions of the present disclosure, the mechanical properties before and/or after subjection to PWTH and the HAZ toughness at butting faces joined by welding were inferior. For example, for No. 8, although its steel compositional range was within the range of the present disclosure, strength reduction due to PWHT was noticeable and TS after PWHT was below 625 MPa. The reason is considered to be that the heating temperature before hot rolling was low and elements for strengthening by precipitation were not sufficiently dissolved, resulting in insufficient dispersion and precipitation of fine carbides during the subsequent cooling. For No. 9, although its steel compositional range was within the range of the present disclosure, the yield strength was inferior and sufficient toughness can not be maintained after PWHT. The reason is considered to be that the cooling start temperature in the accelerated cooling was low, and ferrite was formed in the microstructure of the steel plate. For Nos. 10 and 11, although their steel compositional ranges were within the range of the present disclosure, yield strength and Charpy properties of base metal were inferior. The reason is considered to be that the fraction of MA in the microstructure of the steel plate increased as a result of the cooling end temperature in the accelerated cooling not satisfying the conditions of the present disclosure.

For Nos. 12 to 16, since the steel compositional ranges were outside the range of the present disclosure, Nos. 12 to 16 were inferior in at least one of strength of base metal, Charpy properties, or HAZ toughness at butting faces joined by welding. For example, $C_{eq}$ of No. 15 did not satisfy the conditions of the present disclosure, and as a result the strength before and after PWHT was not as high as API X80 grade. For No. 16, O and the values of Z did not satisfy the conditions of the present disclosure, resulting in a noticeable reduction in toughness in HAZ at butting faces.

TABLE 1

| Steel ID | C | Si | Mn | P | S | Cr | Mo | Ti | Nb | V | Al | Cu | Ni | Ca | O | N | Ceq (mass %) | Pcm (mass %) | X | Y | Z | Remarks |
|---|---|---|---|---|---|---|---|---|---|---|---|---|---|---|---|---|---|---|---|---|---|---|
| | Chemical composition (mass %) | | | | | | | | | | | | | | | | | | | | | |
| A | 0.055 | 0.04 | 1.90 | 0.006 | 0.0012 | 0.33 | 0.28 | 0.012 | 0.030 | — | 0.028 | — | — | 0.0023 | 0.002 | 0.004 | 0.49 | 0.19 | 2.14 | 0.03 | 2.30 | Conforming steel |
| B | 0.057 | 0.02 | 1.88 | 0.005 | 0.0010 | 0.20 | 0.21 | 0.012 | 0.022 | — | 0.031 | 0.16 | 0.16 | — | 0.0018 | 0.004 | 0.47 | 0.19 | 1.37 | 0.03 | 2.08 | |
| C | 0.060 | 0.15 | 1.85 | 0.004 | 0.0008 | 0.07 | 0.23 | 0.012 | 0.030 | — | 0.028 | 0.25 | 0.25 | — | 0.0015 | 0.004 | 0.46 | 0.19 | 0.86 | 0.03 | 2.54 | |
| D | 0.055 | 0.04 | 2.00 | 0.004 | 0.0015 | 0.28 | 0.28 | 0.012 | 0.030 | — | 0.028 | — | — | — | 0.0015 | 0.004 | 0.50 | 0.19 | 1.93 | 0.03 | 2.30 | |
| E | 0.061 | 0.17 | 1.80 | 0.004 | 0.0006 | 0.10 | 0.21 | 0.011 | 0.021 | 0.008 | 0.034 | 0.25 | 0.28 | — | 0.0028 | 0.005 | 0.46 | 0.19 | 0.93 | 0.03 | 2.74 | |
| F | 0.064 | 0.20 | 1.93 | 0.005 | 0.0006 | 0.33 | 0.21 | 0.012 | 0.035 | — | 0.037 | — | — | 0.0028 | 0.0021 | 0.004 | 0.49 | 0.20 | 1.71 | 0.04 | 2.95 | |
| G | 0.053 | 0.08 | 1.67 | 0.008 | 0.0008 | 0.05 | 0.35 | 0.020 | 0.020 | 0.012 | 0.041 | 0.15 | 0.21 | 0.0023 | 0.002 | 0.004 | 0.44 | 0.18 | 1.24 | 0.05 | 3.08 | |
| H | 0.085 | 0.10 | 1.65 | 0.006 | 0.0008 | 0.12 | 0.28 | 0.012 | 0.031 | — | 0.030 | — | — | — | 0.002 | 0.004 | 0.44 | 0.20 | 0.82 | 0.03 | 3.80 | Comparative steel |
| I | 0.055 | 0.04 | 1.90 | 0.004 | 0.0015 | — | 0.20 | 0.015 | 0.020 | — | 0.028 | 0.25 | 0.25 | 0.0023 | 0.0015 | 0.004 | 0.45 | 0.18 | 0.57 | 0.03 | 2.14 | |
| J | 0.053 | 0.19 | 1.71 | 0.008 | 0.0008 | — | 0.29 | 0.008 | 0.005 | 0.042 | 0.041 | 0.30 | 0.22 | — | 0.002 | 0.005 | 0.44 | 0.19 | 0.92 | 0.06 | 3.52 | |
| K | 0.058 | 0.14 | 1.78 | 0.008 | 0.0008 | — | 0.22 | 0.011 | 0.020 | — | 0.033 | 0.10 | 0.15 | — | 0.002 | 0.004 | 0.42 | 0.17 | 0.57 | 0.02 | 1.95 | |
| L | 0.060 | 0.25 | 1.90 | 0.008 | 0.0009 | 0.33 | 0.20 | 0.010 | 0.033 | 0.010 | 0.028 | — | — | 0.0023 | 0.0055 | 0.004 | 0.48 | 0.19 | 1.83 | 0.04 | 3.22 | |

*The balance consists of Fe and inevitable impurities.

TABLE 2

| No. | Steel raw material: Steel ID | Steel raw material: $Ar_3$ (° C.) | Steel raw material: T | Heating: Heating temp. (° C.) | Hot rolling: Rolling finish temp. (° C.) | Accelerated cooling: Cooling start temp. (° C.) | Accelerated cooling: Cooling rate (° C./s) | Accelerated cooling: Cooling end temp. (° C.) | Plate thickness (mm) | Remarks |
|---|---|---|---|---|---|---|---|---|---|---|
| 1 | A | 714 | 452 | 1160 | 770 | 730 | 30 | 490 | 20 | Example |
| 2 | B | 710 | 451 | 1150 | 850 | 800 | 35 | 425 | 25 | |
| 3 | C | 705 | 450 | 1150 | 850 | 800 | 35 | 430 | 25 | |
| 4 | D | 706 | 449 | 1180 | 780 | 740 | 35 | 480 | 25 | |
| 5 | E | 708 | 451 | 1150 | 780 | 740 | 35 | 450 | 25 | |
| 6 | F | 714 | 448 | 1180 | 790 | 750 | 40 | 450 | 28 | |
| 7 | G | 717 | 459 | 1150 | 800 | 760 | 35 | 450 | 25 | |
| 8 | B | 710 | 451 | 1000 | 850 | 800 | 35 | 425 | 25 | Comparative Example |
| 9 | B | 710 | 451 | 1180 | 750 | 680 | 30 | 430 | 25 | |
| 10 | B | 710 | 451 | 1150 | 850 | 800 | 35 | 550 | 25 | |
| 11 | B | 710 | 451 | 1150 | 850 | 800 | 35 | 300 | 25 | |
| 12 | H | 727 | 449 | 1180 | 800 | 750 | 30 | 480 | 25 | |
| 13 | I | 706 | 452 | 1180 | 800 | 750 | 35 | 480 | 25 | |
| 14 | J | 715 | 459 | 1150 | 800 | 740 | 35 | 480 | 25 | |
| 15 | K | 722 | 456 | 1150 | 780 | 740 | 35 | 500 | 28 | |
| 16 | L | 718 | 450 | 1180 | 780 | 740 | 35 | 490 | 20 | |

TABLE 3

| No. | Steel ID | Microstructure Area fraction of MA* (%) | Mechanical properties (before PWHT) 0.5% YS (MPa) | TS (MPa) | $vE_{-10^\circ C.}$ (J) | Mechanical properties (after PWHT) 0.5% YS (MPa) | TS (MPa) | $vE_{-10^\circ C.}$ (J) | Toughness at butting faces joined by welding: Average of Root-FL $vE_{-10^\circ C.}$ (J) | Minimum of Root-FL $vE_{-10^\circ C.}$ (J) | Remarks |
|---|---|---|---|---|---|---|---|---|---|---|---|
| 1 | A | 1.0 | 625 | 714 | 262 | 581 | 711 | 257 | 164 | 96 | Example |
| 2 | B | 1.6 | 564 | 710 | 297 | 591 | 688 | 265 | 182 | 112 | |
| 3 | C | 1.2 | 569 | 697 | 296 | 587 | 672 | 274 | 152 | 66 | |
| 4 | D | 1.9 | 628 | 738 | 276 | 597 | 721 | 253 | 171 | 82 | |
| 5 | E | 0.8 | 607 | 698 | 273 | 593 | 672 | 269 | 148 | 73 | |
| 6 | F | 2.3 | 603 | 679 | 362 | 592 | 668 | 302 | 142 | 67 | |
| 7 | G | 1.0 | 617 | 716 | 260 | 604 | 697 | 262 | 123 | 61 | |
| 8 | B | 1.3 | 650 | 654 | 309 | 650 | 607 | 297 | 182 | 112 | Comparative |
| 9 | B | 1.7 | 512 | 685 | 266 | 542 | 663 | 242 | 182 | 112 | Example |
| 10 | B | 5.2 | 505 | 715 | 239 | 565 | 643 | 283 | 182 | 112 | |
| 11 | B | 3.5 | 519 | 738 | 248 | 583 | 680 | 276 | 182 | 112 | |
| 12 | H | 6.8 | 508 | 722 | 232 | 558 | 684 | 261 | 163 | 58 | |
| 13 | I | 0.6 | 582 | 689 | 334 | 564 | 613 | 351 | 192 | 101 | |
| 14 | J | 1.1 | 572 | 692 | 283 | 589 | 682 | 228 | 86 | 22 | |
| 15 | K | 0.2 | 543 | 624 | 367 | 531 | 606 | 345 | 208 | 94 | |
| 16 | L | 1.5 | 625 | 740 | 251 | 584 | 724 | 237 | 117 | 16 | |

*MA: martensite austenite constituent

INDUSTRIAL APPLICABILITY

According to the present disclosure, it is possible to provide, as a high-strength steel plate of API X80 grade or higher with a thickness of 38 mm or more, a steel plate for structural pipes or tubes that exhibits excellent resistance to PWHT and excellent toughness at the heat-affected zone, particularly at the butting faces joined by welding, without addition of large amounts of alloying elements, and a structural pipe or tube formed from the steel plate for structural pipes or tubes. The structural pipe or tube maintains excellent mechanical properties not only in a state of base metal but also after subjection to PWHT, in which toughness reduction at the butting faces joined by welding is suitably suppressed, and thus is extremely useful as a structural pipe or tube for a conductor casing steel pipe or tube, a riser steel pipe or tube, and so on.

The invention claimed is:

1. A steel plate for structural pipes or tubes, comprising: a chemical composition that contains, in mass %, C: 0.050% to 0.080%,
Si: 0.01% to 0.50%,
Mn: 1.50% to 2.50%,
Al: 0.080% or less,
Cr: 0.28% or less,
Mo: 0.10% to 0.50%,
Ti: 0.005% to 0.025%,
Nb: 0.005% to 0.050%,
N: 0.001% to 0.010%,
O: 0.0050% or less,
P: 0.010% or less,
S: 0.0020% or less, and the balance being Fe and inevitable impurities, with the chemical composition satisfying a set of conditions including:

a carbon equivalent $C_{eq}$ as defined by the following Expression (1) of 0.43 or more, $P_{cm}$ as defined by the following Expression (2) of 0.20 or less, X as defined by the following Expression (3) of 0.8 or more, Y as defined by the following Expressions (4) and (5) of more than 0.01 and 0.03 or less, and Z as defined by the following Expression (6) of less than 3.10:

$$C_{eq}=C+Mn/6+(Cu+Ni)/15+(Cr+Mo+V)/5 \quad (1),$$

$$P_{cm}=C+Si/30+Mn/20+Cu/20+Mo/15+V/10+5B \quad (2),$$

$$X=(0.23Cr+0.125Mo+0.13Nb+0.24V+0.25Ti)/C \quad (3),$$

$$Y=A*55.85 \quad (4),$$

$$A=Ti/47.9+Nb/92.9+V/50.9 \quad (5),$$

$$Z=(C/12-A)*A*1000000 \quad (6),$$

where each element symbol indicates content in mass % of the element in the steel plate and has a value of 0 if the element is not contained in the steel plate, wherein the steel plate has mechanical properties including:

(a) a 0.5% yield strength of 555 MPa or more and 628 MPa or less;

(b) a tensile strength of 625 MPa or more and 738 MPa or less; and (c) a Charpy absorption energy $vE_{-10^\circ C.}$ at 10° C. at its mid-thickness part of 250 J or more, and the steel plate maintains the mechanical properties (a) to (c) even after subjection to heat treatment at 650° C. for 2 hours.

2. The steel plate for structural pipes or tubes according to claim 1, wherein the chemical composition further contains, in mass %, V: 0.030% or less.

3. The steel plate for structural pipes or tubes according to claim 2, wherein the chemical composition further contains, in mass %, one or more selected from the group consisting of Cu: 0.50% or less,
Ni: 0.50% or less, and
Ca: 0.0005% to 0.0035%.

4. The steel plate for structural pipes or tubes according to claim 1, wherein the chemical composition further contains, in mass %, one or more selected from the group consisting of Cu: 0.50% or less, Ni: 0.50% or less, and Ca: 0.0005% to 0.0035%.

5. The steel plate for structural pipes or tubes according to claim 1, wherein a thickness of the steel plate is 20 mm or more and 30 mm or less.

6. A structural pipe or tube formed from the steel plate for structural pipes or tubes as recited in claim 1.

7. A structural pipe or tube formed from the steel plate for structural pipes or tubes as recited in claim 2.

8. A structural pipe or tube formed from the steel plate for structural pipes or tubes as recited in claim 4.

9. A structural pipe or tube formed from the steel plate for structural pipes or tubes as recited in claim 3.

10. A structural pipe or tube obtainable by forming the steel plate as recited in claim 1 into a tubular shape in its longitudinal direction, and then joining butting faces by welding from inside and outside to form at least one layer on each side along the longitudinal direction.

11. A method of producing a steel plate for structural pipes or tubes of claim 1, comprising at least:

heating a steel raw material having the chemical composition as recited in claim 8 to a heating temperature of 1050° C. to 1250° C.;

hot-rolling the heated steel raw material to obtain a steel plate;

accelerated-cooling the hot-rolled steel plate under a set of conditions including a cooling start temperature being no lower than $Ar_3$, a cooling end temperature being no lower than (T−50) ° C. and no higher than (T+50) ° C., where T is a temperature defined by the following Expression (7), and an average cooling rate being 20° C./s or higher:

$$T=539-423C-30.4Mn-17.7Ni-12.1Cr-7.5Mo \quad (7),$$

where each element symbol indicates content in mass % of the element in the steel plate and has a value of 0 if the element is not contained in the steel plate.

12. A method of producing a steel plate for structural pipes or tubes of claim 2, comprising at least:

heating a steel raw material having the chemical composition as recited in claim 9 to a heating temperature of 1050° C. to 1250° C.;

hot-rolling the heated steel raw material to obtain a steel plate;

accelerated-cooling the hot-rolled steel plate under a set of conditions including a cooling start temperature being no lower than $Ar_3$, a cooling end temperature being no lower than (T−50) ° C. and no higher than (T+50) ° C., where T is a temperature defined by the following Expression (7), and an average cooling rate being 20° C./s or higher:

$$T=539-423C-30.4Mn-17.7Ni-12.1Cr-7.5Mo \quad (7),$$

where each element symbol indicates content in mass % of the element in the steel plate and has a value of 0 if the element is not contained in the steel plate.

13. A method of producing a steel plate for structural pipes or tubes of claim 4, comprising at least:

heating a steel raw material having the chemical composition as recited in claim 10 to a heating temperature of 1050° C. to 1250° C.;

hot-rolling the heated steel raw material to obtain a steel plate;

accelerated-cooling the hot-rolled steel plate under a set of conditions including a cooling start temperature being no lower than $Ar_3$, a cooling end temperature being no lower than (T−50) ° C. and no higher than (T+50) ° C., where T is a temperature defined by the following Expression (7), and an average cooling rate being 20° C./s or higher:

$$T=539-423C-30.4Mn-17.7Ni-12.1Cr-7.5Mo \quad (7),$$

where each element symbol indicates content in mass % of the element in the steel plate and has a value of 0 if the element is not contained in the steel plate.

14. A method of producing a steel plate for structural pipes or tubes of claim 3, comprising at least:

heating a steel raw material having the chemical composition as recited in claim 11 to a heating temperature of 1050° C. to 1250° C.;

hot-rolling the heated steel raw material to obtain a steel plate;

accelerated-cooling the hot-rolled steel plate under a set of conditions including a cooling start temperature being no lower than $Ar_3$, a cooling end temperature being no lower than (T−50) ° C. and no higher than (T+50) ° C., where T is a temperature defined by the following Expression (7), and an average cooling rate being 20° C./s or higher:

$$T=539-423C-30.4Mn-17.7Ni-12.1Cr-7.5Mo \quad (7),$$

where each element symbol indicates content in mass % of the element in the steel plate and has a value of 0 if the element is not contained in the steel plate.

* * * * *